June 20, 1961

A. TURAK 2,989,243

CARBONATED LIQUID VALVE

Filed April 19, 1960

*INVENTOR.*
ANTHONY TURAK
BY *Woodling and Krost,*
ATTORNEYS

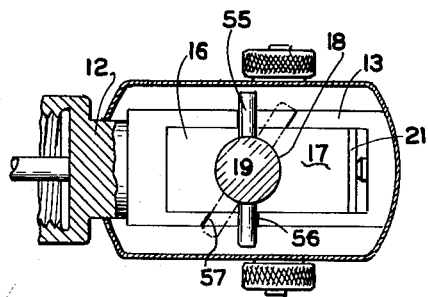
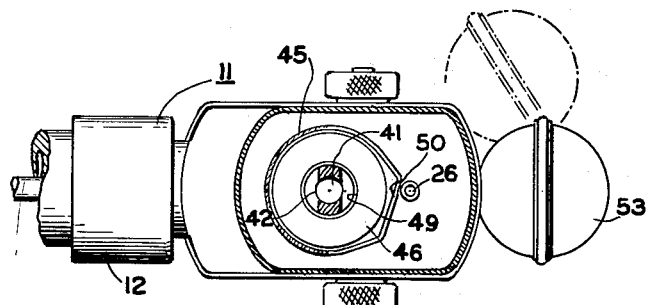
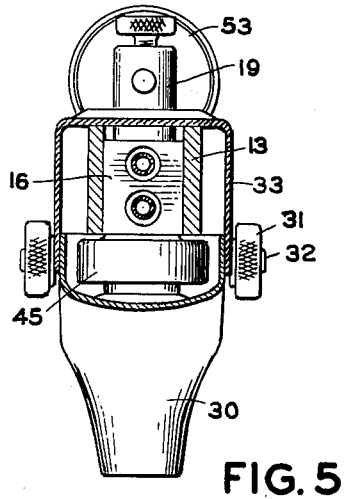
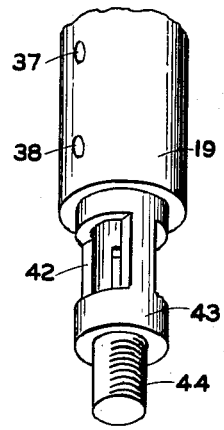
INVENTOR.
ANTHONY TURAK

United States Patent Office 2,989,243
Patented June 20, 1961

2,989,243
CARBONATED LIQUID VALVE
Anthony Turak, 11208 Lorain Ave., Cleveland, Ohio
Filed Apr. 19, 1960, Ser. No. 23,303
12 Claims. (Cl. 239—113)

The invention relates in general to dispensing valves and more particularly to valves to dispense a carbonated liquid.

The dispensing of carbonated liquids, especially beverages, has been done by various types of valves and some form of dispensing device has been used in the past to break up the carbonated liquid, such as soda water. This breaking up of the liquid is to help obtain a "soft" soda effect supposedly to help the release of the carbon dioxide from the liquid. The amount of retained carbon dioxide in the liquid at the time it is drunk determines the amount of "bite" or sharpness of taste sensation. If quite a bit of carbon dioxide is retained in the liquid then the drink will have considerable "bite" and if most of the carbon dioxide has escaped in the form of bubbles before the liquid is drunk then the beverage will taste flat. Testing devices on the market for testing soda water have shown that where the soda water is dispensed at about 38° F. and with a 3½% concentration of carbonation the taste is about average. The prior art dispensing valves have had great difficulty in exceeding this concentration except at low rates of flow which have been too slow for commercial use for soda fountains and the like.

Accordingly, an object of the invention is to provide a dispensing valve for carbonated beverages which will retain an average rate of flow yet maintain higher than average carbonation or conversely an average carbonation cn be obtained with a greater than average rate of flow.

Another object of the invention is to provide a postmix dispensing valve to mix carbonated water with a flavoring extract just as the two liquids are dispensed.

Still another object of the invention is to provide a dispensing valve which will maintain a high percentage of retained or dissolved carbon dioxide in the liquid being dispensed.

Still another object of the invention is to provide a dispensing valve with a diffuser for the carbonated liquid, which diffuser has a large area for passage of the liquid, yet a small transverse dimension, the combination permitting relatively large volume of flow while maintaining a high percentage of dissolved carbon dioxide.

Still another object of the invention is to provide a diffuser for a dispensing valve with plural passageways for the flow of carbonated water, which passageways are very small in transverse dimension to retain or redissolve carbondioxide in the liquid.

Still another object of the invention is to provide a postmix dispensing valve with a diffuser having a director to direct flow of soda water to the inside of a spout to wash it clean of any flavoring syrup or extract.

Other objects and a fuller understanding of the invention may be had be referring to the following description and claims, taken in conjunction with the accompanying drawings, in which:

Figure 2:
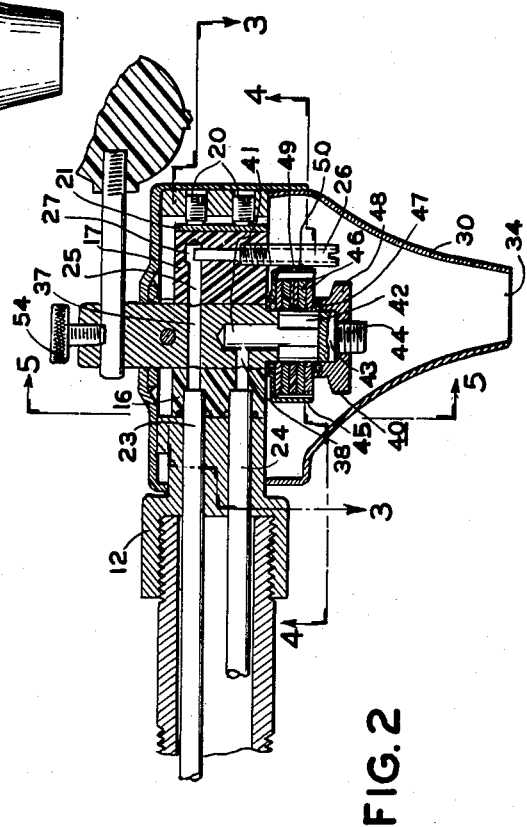
FIGURE 2 is an elevational, longitudinal, sectional view of the valve.

FIGURES 3, 4 and 5 are sectional views on lines 3—3, 4—4 and 5—5, respectively, of FIGURE 2; and FIGURE 6 is an enlarged three-dimensional view of part of the valve plug.

The figures of the drawing show a complete dispensing valve 11 which includes a tubular base 12 on which is fixedly mounted a yoke 13. First and second body portions 16 and 17 are carried within the yoke 13 and together define a generally cylindrical valve chamber 18. A cylindrical valve plug 19 is carried within the valve chamber 18 and screws 20 threaded in the front of the yoke 13 bear against a plate 21 and act to compress together the first and second body portions 16 and 17 on the valve plug 19. The body portions 16 and 17 may be made of some composition material and one suitable material is nylon or that trademarked "Teflon" for good self-lubricating and sealing properties.

The first body portion 16 is in sealing engagement with first and second entrance conduits 23 and 24 entering through the tubular base 12. These entrance conduits lead to the valve chamber 18. An exit conduit 25 is provided in the second body portion 17, and a discharge tube 26 is threadably received in a threaded portion of this exit conduit. The discharge tube 26 may be threadably adjusted toward and away from an end wall 27 for regulating the flow of liquid through the exit conduit 25.

The discharge tube 26 leads to a spout 30 carried on the lower end of the valve 11 by nuts 31 threaded on bolts 32 carried in the spout 30 and with these nuts frictionally engaging a cover 33 for the upper part of the valve 11. The lower end of the spout 30 provides a discharge opening 34 for the valve 11.

Figure 1:
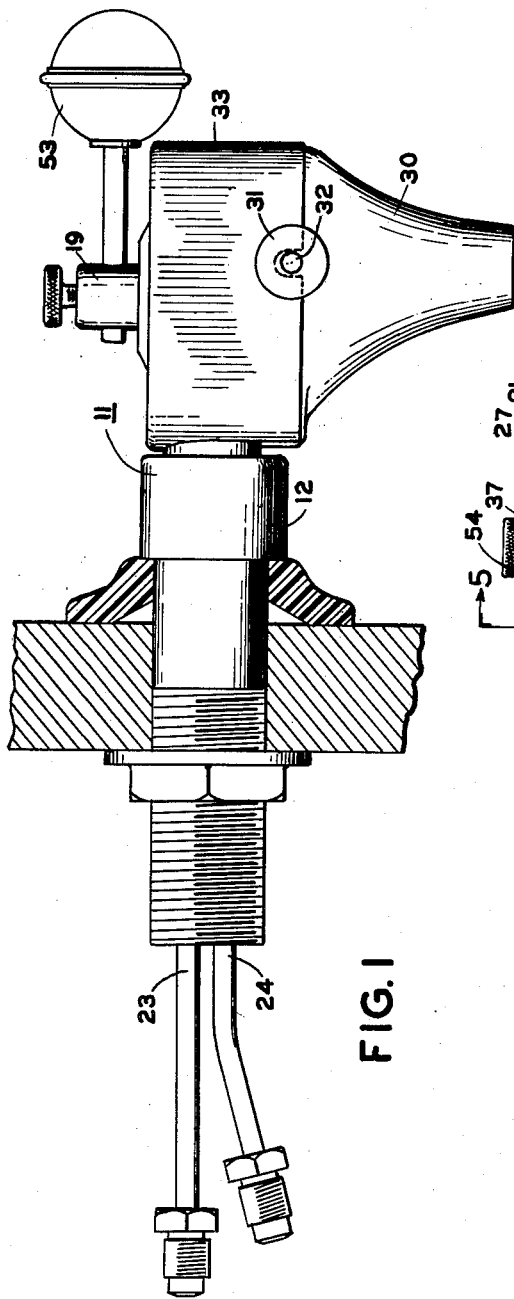
FIGURE 1 is a side elevational view of a valve incorporating the invention.

A first transverse bore 37 is provided in the valve plug 19 and selectively registers with the first entrance conduit 23 and the exit conduit 25 when the valve plug 19 is in a first position. This first position is that shown in FIGURES 1 and 2 and shown in solid lines in FIGURES 3 and 4. A second transverse bore 38 in the valve plug 19 selectively registers with the second entrance conduit 24 at the same time as registration of the first bore 37 with the entrance conduit 23.

A diffuser 40 is carried on one axial end of the valve plug 19. This diffuser has an axial inlet conduit 41 which is disposed vertically since the valve plug 19 is disposed vertically. This diffuser inlet conduit 41 communicates at one end with the second transverse bore 38 and at the other end terminates at and communicates with a transverse aperture 42. The axial inlet conduit 41 is provided in a central shaft extension 43 of the valve plug 19 and the outboard or lower end of this central shaft extension is threaded at 44. An antisplash housing 45 has a generally inverted cup shape and has a central aperture to be slidably received over the central shaft extension 43. A plurality of flat diffuser washers 46 form a stack which is slidably received on the central shaft 43 at the transverse aperture 42. O-ring seals 47 are provided at the top and bottom of the stack 46 to relatively seal the stack and the central shaft 43. A knurled nut 48 is threaded on the central shaft end and variably compresses the stack of washers 46. Actually a greater number of washers and thinner washers are used than shown in the drawing, but for clarity of illustration thicker washers have been used. The inner edge of the washers is chamfered at 49 and this is the leading edge of the washer which faces the flow of liquid from the entrance conduit 24. The antisplash housing 45 has a director section 50 which is spaced from the cylindrical periphery of the stack of washers 46 a greater extent than the majority of the periphery of the antisplash housing 45.

The diffuser 40 is thus carried on the lower axial end of the valve plug 19, and accordingly, moves with it. The upper end of the valve plug carries a handle 53 retained by a screw 54 and this handle may be manipulated to move the valve plug from the first position shown in FIGURES 1 and 2 to a second position shown in dotted lines in FIGURE 4. A cross bar 55 in the valve plug 19, and better shown in FIGURE 3 abuts a stop 56 in the yoke 13 to establish the first position of the valve plug and abuts a second stop 57 to establish the second position.

*Operation*

The dispensing valve 11 may be used to postmix a carbonated liquid, such as soda water, from the entrance conduit 24 with a flavoring extract or syrup from the entrance conduit 23. When the valve plug 19 is moved from the second position shown in dotted lines in FIGURE 4 to the first position shown in solid lines the valve will be opened to liquid flow from both entrance conduits 23 and 24. The flavoring extract will be dispensed through the discharge tube 26 to the discharge opening 34 and will bypass the diffuser 40. The carbonated liquid will flow through the diffuser 40 and will enter it at the transverse aperture 42. As the carbonated water under pressure; e.g., 100–125 p.s.i. reaches the diffuser washers 46, the first action may be to spurt out at the top of the stack and this is the purpose of the antisplash housing 45 to direct this initial flow downwardly. The pressure of the soda water in trying to escape between the faces of the washers 46 and acting on the chamfered edges 49 forces apart the washers for substantially uniform spacing between each pair of adjacent faces. Accordingly, a large area of discharge is obtained by flow between all these adjacent faces, yet the transverse dimension between the washers is very small in the order of a few thousandths of an inch. The nut 48 may be tightened to the desired degree to limit the rate of flow and the tighter the nut the smaller the rate of flow, yet the greater the amount of retained or redissolved carbon dioxide. A high pressure is developed in the transverse aperture 42 and this pressure is that which establishes substantially equal flow between the faces of the washers and it is also believed that this maintains the very high percentage of retained carbon dioxide in the carbonated liquid as it is being dispensed.

The prior art dispensers for soda water had difficulty in obtaining much better than 3½% of retained carbon dioxide in the beverage as it was dispensed at 38° F. and with an average dispensing rate of six fluid ounces in three seconds. The dispensing valve 11 will dispense six ounces in three seconds and yet obtain 5½ to 6% concentration of carbon dioxide at this temperature of 38° F., and hence, will provide considerably more "bite" to the soda water than was heretofore obtainable. Conversely, if only an average amount of carbonation of about 3½% is desired, the nut 48 may be loosened slightly to decrease the amount of carbonation yet to increase the total rate of flow to a greater than average extent.

The above description is true whether the valve 11 is used merely for dispensing soda water alone or is used as a postmix valve to dispense soda water through the diffuser 40 at the same sime that flavoring extract is dispensed from the discharge tube 26. In the latter case the director section 50 directs some of the soda water forwardly, that is, toward the discharge tube 26, to wash clean the inside of the spout 30 so that there will not be any flavoring extract remaining on the inside of the spout 30. This assures that each time a flavored beverage is dispensed there will be the same proportion of soda water to extract for uniform quality.

It has been found that after initial flow of carbonated water through the diffuser 40 the soda water flows generally downwardly around the stack 46 and that the antisplash housing 45 would not be needed at this time; its use is primarily to limit the initial flow and to direct it downwardly. The antisplash housing 45, since it is a part of the diffuser 40, turns with the valve plug 19, and accordingly, the director section 50 moves through the same angle of about 30 degrees, yet since this director section 50 has a flat forward wall it provides an enlarged portion adjacent the discharge tube 26 when the valve plug is in the first or fluid discharging position. This is best seen in FIGURE 4. The valve as actually constructed has used eleven diffuser washers which are ground and lapped for smoothness so that the adjacent faces are parallel. This maintains uniform the flow of liquid between all adjacent faces. Also it determines that the pressure built up within the transverse aperture 42 prevents the carbon dioxide in the liquid all the way back through the entrance conduit 24 to the source of the soda water from being released as a gas. In many previous dispensing valves, once the valve was opened the pressure was reduced all along the line completely back to the source of the carbonated water. This meant that the carbon dioxide tended to go out of solution with the liquid and would form as individual gas bubbles along the various passageways from the carbonated water source to the discharge opening of the valve. Accordingly, long before the soda water was dispensed much of the carbon dioxide had left it in the form of gas bubbles.

The present valve prevents much of this escaping of the carbon dioxide as gas bubbles before reaching the diffuser 40 and additionally it is felt that the action of the diffuser 40 is such that any gas bubbles formed prior to flow through the diffuser 40 are caused to be redissolved into the soda water because of the extremely small transverse passageways between the washers 46 which will provide intimate contact between any gas bubbles and the broad surface of the liquid.

The action of the diffuser 40 is in a sense opposite to its name, in that it really tends to fuse together or pack together any bubbles of carbon dioxide and the water as they pass through this diffuser. In the prior art, the diffusers did just that; namely, to act on a hard stream of soda water and to break it up to produce a "soft" stream. As a result, the breaking up of the stream resulted in considerable loss of carbon dioxide being released as gas bubbles before the beverage was drunk. In the case of the diffuser of the present invention, any bubbles of carbon dioxide released from the water before it passes through the diffuser become greatly flattened instead of spherical as they pass between the plates or washers 46 of the diffuser, and as a result they have a large area of intimate contact with the surface of the water to compact or fuse the gas bubbles back into the water.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A dispensing valve comprising, in combination, valve body means having a valve chamber, a valve plug contained within said valve chamber, a discharge opening in said valve, an entrance conduit in said body means adapted to be connected to a source of carbonated liquid and leading to said valve chamber, a diffuser carried in said valve, said diffuser having entrance and exit means communicating with said discharge opening, bore means in said valve plug to selectably pass fluid from said entrance conduit to said diffuser entrance means, a stack of diffuser plates in said diffuser between said entrance and exit means, said plates having closely spaced surfaces over a large area relative to the spacing between said plates, chamfered leading edges on said plates facing the flow of liquid through said diffuser to aid in establishing substantially equal liquid flow between the adjacent faces of all said plates, and means acting axially on said stack of plates to compress together said stack of plates to a variable degree to limit liquid flow between said plates.

2. A dispensing valve comprising, in combination, valve body means having a valve chamber, a valve plug contained within said valve chamber, a discharge opening in said valve, an entrance conduit in said body means adapted to be connected to a source of carbonated liquid and leading to said valve chamber, a diffuser carried in said valve, said diffuser having entrance and exit means with said exit means communicating with said discharge opening, bore means in said valve plug selectably registrable with said entrance conduit with said valve plug in a first position to provide communication from said entrance conduit to said diffuser entrance means, a stack of contiguous flat diffuser plates in said diffuser between said entrance and exit means, chamfered leading edges on said plates facing the flow of liquid through said diffuser to aid in establishing substantially equal liquid flow between the adjacent faces of all said plates, and screw means acting axially on said stack of plates to compress together said stack of plates to a variable degree to limit liquid flow between said plates.

3. A dispensing valve comprising, in combination, valve body means having a valve chamber, a valve plug contained within said valve chamber, a discharge opening in said valve, an entrance conduit in said body means leading to said valve chamber, a diffuser carried in said valve, said diffuser having a central shaft with a conduit therein connecting with a transverse aperture through said central shaft, a stack of flat diffuser washers slidably received on said central shaft at said transverse aperture, a housing surrounding but spaced from the periphery of said washers, seal means at the top and bottom of said stack of washers relatively sealing said stack of washers and said central shaft, a nut threadably received on said central shaft to compress together said stack of washers to a variable degree to limit liquid flow between said washers, one of said housing and said shaft conduit being the entrance means to said diffuser and connected to receive fluid from said valve plug, the edges of said washers facing the liquid flow being chamfered to aid in establishing equal flow among all washers, the other of said housing and shaft conduit being the exit means of said diffuser and leading to said discharge opening, and bore means in said valve plug registering with said entrance conduit with said valve plug in a first position to provide discharge of a liquid from said entrance conduit through said diffuser to said discharge opening.

4. A dispensing valve comprising, in combination, body means, a rotatable valve plug in said body means, a spout as part of said valve below said body means, a discharge opening in said spout, an entrance conduit in said body means leading to said valve plug, a diffuser having an inlet conduit therein, bore means in said valve plug and arranged to selectively pass fluid to said diffuser inlet conduit, a stack of flat diffuser plates in said diffuser, chamfered leading edges on said plates facing the flow of fluid to substantially evenly divide the flow of fluid among all said plates, the fluid flow from said diffuser leading to the inside of said spout, and adjustable means to adjustably compress together said stack of plates to a variable degree to limit liquid flow between said plates.

5. A dispensing valve comprising, in combination, first and second body portions defining a valve chamber, a rotatable valve plug contained within said valve chamber, a spout as part of said valve below said body portions, a discharge opening in said spout, an entrance conduit in said first body portion leading to said valve chamber, a diffuser having an inlet conduit therein, bore means in said valve plug arranged for selective registration with said entrance conduit to pass fluid to said diffuser inlet conduit, a stack of flat diffuser plates in said diffuser, chamfered edges on the leading edge of said plates facing the flow of fluid, at least part of the periphery of said stack of plates being a fluid exit from said diffuser, an antisplash housing at said diffuser exit close to but spaced from the exit periphery of said stack, the fluid flow from said diffuser leading to the inside of said spout, and threaded means to compress together said stack of plates to a variable degree to limit liquid flow between said plates.

6. A dispensing valve comprising, in combination, first and second body portions defining a valve chamber, a rotatable valve plug contained within said valve chamber, a spout as part of said valve below said body portions, a discharge opening in said spout, first and second entrance conduits in said first body portion leading to said valve chamber, an exit conduit in said second body portion leading from said valve chamber and passing to said spout, a diffuser having a central shaft with an axial inlet conduit therein, first and second bore means in said valve plug and arranged for selective registration with said entrance conduits to pass fluid to said exit conduit and to said diffuser inlet conduit, said diffuser inlet conduit terminating in a transverse aperture at one end thereof, a stack of flat diffuser washers received on said central shaft at said transverse aperture, chamfered edges on the inner periphery of said washers, an antisplash housing covering one end of said stack and surrounding but spaced from a majority of the periphery of said washers, a director section in said antisplash housing facing said exit conduit inside said spout to wash clean the inside of said spout, seal means at the two axial ends of said stack relatively sealing said stack and said central shaft, and a nut threadably received on the outboard end of said central shaft to compress together said stack of washers to a variable degree to limit liquid flow between said washers.

7. A dispensing valve comprising, in combination, first and second body portions defining a valve chamber, a rotatable valve plug contained within said valve chamber, a spout as part of said valve below said body portions, a discharge opening in said spout, entrance conduit means in said first body portion leading to said valve chamber, a diffuser carried on one axial end of said valve plug, said diffuser having a central shaft with an axial inlet conduit therein, bore means in said valve plug arranged for selective registration with said entrance conduit means to pass fluid to said diffuser inlet conduit, said diffuser inlet conduit terminating in a transverse aperture at one end thereof, a stack of a plurality of flat diffuser washers slidably received on said central shaft at said transverse aperture, chamfered edges on the inner periphery of said washers, an antisplash housing covering one end of said stack and surrounding but spaced from a majority of the periphery of said washers, seal means at the two axial ends of said stack relatively sealing said stack and said central shaft, and a nut threadably received on the outboard end of said central shaft to compress together said stack of washers to a variable degree to limit liquid flow between said washers.

8. A dispensing valve comprising, in combination, first and second body portions defining a valve chamber, a rotatable valve plug contained within said valve chamber, a spout as part of said valve below said body portions, a discharge opening in said spout, an entrance conduit in said first body portion leading to said valve chamber, a diffuser carried on one axial end of said valve plug, said diffuser having a central shaft with a vertical inlet conduit therein, bore means in said valve plug and arranged for selective registration with said entrance conduit in a first position of said valve plug, a second position of said valve plug being an off position, said vertical inlet conduit terminating in a transverse aperture at the lower end thereof, a stack of a plurality of flat diffuser washers slidably received on said central shaft at said transverse aperture, chamfered edges on the inner periphery of said washers, an antisplash housing covering the top of said washers and surrounding but spaced from the periphery of said washers, seal means at the top and bottom of said stack of washers relatively sealing said stack of washers and said central shaft, and a nut threadably received on the lower end of said central shaft to compress together said stack of washers to a variable degree to limit liquid flow between said washers.

9. A dispensing valve comprising, in combination, first and second body portions defining a valve chamber, a rotatable valve plug contained within said valve chamber, a spout as part of said valve below said body portions, a discharge opening in said spout, first and second entrance conduits in said first body portion leading to said valve chamber, an exit conduit in said second body portion leading from said valve chamber and passing to said spout, a diffuser carried on one axial end of said valve plug, said diffuser having a central shaft with an axial inlet conduit therein, first and second bore means in said valve plug and arranged for selective registration with said entrance conduits to pass fluid to said exit conduit and to said diffuser inlet conduit, said diffuser inlet conduit terminating in a transverse aperture at one end thereof, a stack of a plurality of flat diffuser washers slidably received on said central shaft at said transverse aperture, chamfered edges on the inner periphery of said washers, an antisplash housing covering one end of said stack and surrounding but spaced from a majority of the periphery of said washers, seal means at the two axial ends of said stack of washers relatively sealing said stack of washers and said central shaft, a nut threadably received on the outboard end of said central shaft to compress together said stack of washers to a variable degree to limit liquid flow between said washers, and said exit conduit by-passing said diffuser and communicating directly with said discharge opening.

10. A dispensing valve comprising, in combination, first and second body portions defining a valve chamber, a rotatable valve plug contained within said valve chamber, a spout as part of said valve below said body portions, a discharge opening in said spout, first and second entrance conduits in said first body portion leading to said valve chamber, an exit conduit in said second body portion leading from said valve chamber and passing to said spout, a diffuser carried on one axial end of said valve plug, said diffuser having a central shaft with a vertical inlet conduit therein, first and second bore means in said valve plug and arranged for selective registration with said entrance conduits in a first position of said valve plug to pass fluid to said exit conduit and to said diffuser inlet conduit, said vertical inlet conduit terminating in a transverse aperture at the lower end thereof, a stack of a plurality of flat diffuser washers slidably received on said central shaft at said transverse aperture, chamfered edges on the inner periphery of said washers, an antisplash housing covering the top of said washers and surrounding but spaced from the periphery of said washers, a director section in said antisplash housing facing the front of said valve and spaced from the periphery of said washers a greater distance than the remainder of said antisplash housing, seal means at the top and bottom of said stack of washers relatively sealing said stack of washers and said central shaft, a nut threadably received on the lower end of said central shaft to compress together said stack of washers to a variable degree to limit liquid flow between said washers, said exit conduit being positioned toward the front of said valve inside said spout, said exit conduit by-passing said diffuser and communicating directly with said discharge opening, and said director section directing fluid from said diffuser toward said exit conduit inside said spout to wash clean the insde of said spout.

11. A dispensing valve comprising, in combination, first and second body portions defining a valve chamber, a cylindrical valve plug contained within said valve chamber, a spout as part of said valve below said body portions, a discharge opening in said spout, first and second entrance conduits in said first body portion leading to said valve chamber, an exit conduit in said second body portion leading from said valve chamber and passing to said spout, first and second bore means in said valve plug and arranged for selective registration with said first and second entrance conduits, respectively, and said first entrance conduit registering with said exit conduit in a first position of said valve plug, a second position of said valve plug being an off position, a diffuser carried on the lower axial end of said valve plug and movable therewith, said diffuser having a central shaft with a vertical inlet conduit therein connected to receive fluid from said second bore means, said vertical inlet conduit terminating in a transverse aperture at the lower end thereof, a stack of a plurality of flat diffuser washers slidably received on said central shaft at said transverse aperture, chamfered edges on the inner periphery of said washers, an antisplash housing covering the top of said washers and surrounding but spaced from the periphery of said washers, a director section in said antisplash housing facing the front of said valve and spaced from the periphery of said washers a greater distance than the remainder of said antisplash housing, seal means at the top and bottom of said stack of washers relatively sealing said stack of washers and said central shaft, a nut threadably received on the lower end of said central shaft to compress together said stack of washers to a variable degree to limit liquid flow between said washers, said exit conduit being positioned toward the front of said valve inside said spout, said exit conduit bypassing said diffuser and communicating directly with said discharge opening, and said director section directing fluid from said diffuser toward said exit conduit inside said spout to wash clean the inside of said spout.

12. A dispensing valve comprising, in combination, a base, a yoke connected to said base, first and second body portions within said yoke, surface means in said body portions defining a valve chamber, a cylindrical valve plug contained within said valve chamber, a spout as part of said valve axially below said valve plug, a discharge opening in said spout, first and second entrance conduits in said first body portion leading to said valve chamber, an exit conduit in said second body portion leading from said valve chamber and passing to said spout, first and second bore means in said valve plug and arranged for selective registration with said first and second entrance conduits, respectively, and said first entrance conduit registering with said exit conduit in a first position of said valve plug, a second position of said valve plug being an off position with said bore means out of registration with said entrance conduits, a diffuser carried on the lower axial end of said valve plug and movable therewith, said diffuser having a central shaft with a vertical inlet conduit therein connected at right angles to said second bore means to receive fluid therefrom, said vertical inlet conduit terminating in a transverse aperture at the lower end thereof, a stack of a plurality of flat diffuser washers slidably received on said central shaft at said transverse aperture, chamfered edges on the inner periphery of said washers, an antisplash housing covering the top of said washers and surrounding but spaced from the periphery of said washers, a director section in said antisplash housing facing the front of said valve and spaced from the periphery of said washers a greater distance than the remainder of said antisplash housing, seal means at the top and bottom of said stack of washers relatively sealing said stack of washers and said central shaft, a nut threadably received on the lower end of said central shaft to compress together said stack of washers to a variable degree to limit liquid flow between said washers, said exit conduit being positioned toward the front of said valve inside said spout, said exit conduit by-passing said diffuser and communicating directly with said discharge opening, and said director section directing fluid from said diffuser toward said exit conduit inside said spout to wash clean the inside of said spout.

References Cited in the file of this patent

UNITED STATES PATENTS

| | | |
|---|---|---|
| 498,962 | Sample | June 6, 1893 |
| 1,956,143 | Brown | Apr. 24, 1934 |
| 2,179,611 | Brown | Nov. 14, 1939 |
| 2,657,952 | Mendonca | Nov. 3, 1953 |